UNITED STATES PATENT OFFICE.

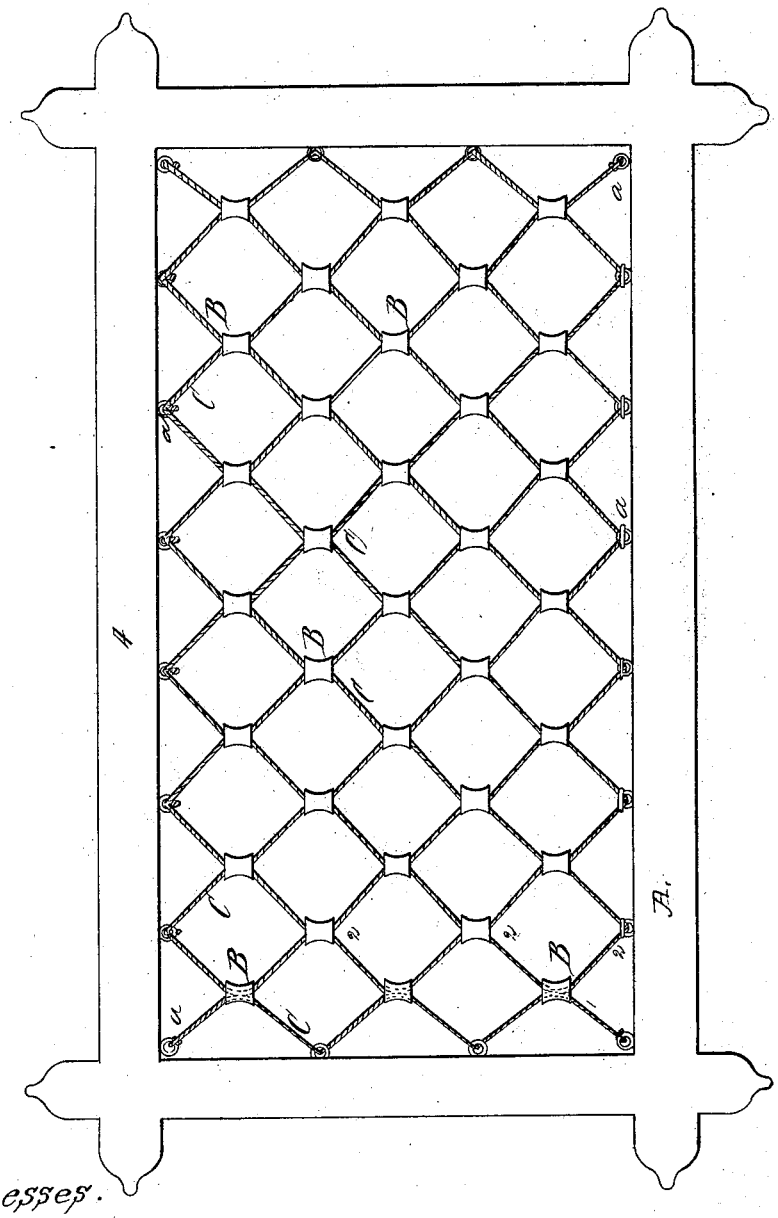

HECTOR HYVES, OF NEW YORK, N. Y.

IMPROVEMENT IN ELASTIC FABRICS.

Specification forming part of Letters Patent No. 46,674, dated March 7, 1865.

*To all whom it may concern:*

Be it known that I, HECTOR HYVES, of the city, county, and State of New York, have invented a new and useful Improvement in Elastic Fabrics; and I do hereby declare that the following is a full, clear, and exact description thereof, which will enable others skilled in the art to make and use the same, reference being had to the accompanying drawing, forming part of this specification.

The drawing, consisting of one figure, gives a plan view of an example—my invention—in which A is the frame to which the fabric is secured, and $a$ the rings or staples through which the strands composing the texture of the fabric are passed, and to which their ends are fastened. My object is to produce a fabric which shall be suitable for the bottom surfaces and backs of chairs, settees, sofas, cots, beds, berths, and all manner of surfaces in which it is desirable to combine the qualities of lightness, elasticity, cleanliness, and economy. The devices now used for the bottoms, sides, or backs of the articles mentioned do not combine these qualities in such perfection as to enable them to supersede the use of the ordinary metallic springs, which continue to be used in large numbers, notwithstanding their constant liability to fracture and become displaced, and the inequalities of the surface they sustain, which result from their peculiar action.

I use any kind of material for strands, and of such fineness and strength as are necessary for the use to which the fabric is to be put. Regard is also had to the appearance of the material in cases where my fabric is to be used without an additional covering-surface. Having chosen the sort of strands to be used, I secure them to the frame of the article in which, or upon which, they are to be used, by means of rings or staples $a$, and pass them through rings of rubber B, or similar elastic material, situated on a line midway between two adjacent staples, and so on across the width of the frame. The rings B, if of rubber, are made by cutting rubber hose of the desired elasticity and thickness into short sections. The strand 1 having been properly secured at both sides of the frame, another strand, 2, is secured to the frame and is roved through the first rubber ring B and then through another ring B, to be placed in a line with one of the staples of the frame and midway between the first and second rubber rings, and so on across to the opposite side of the frame. A continuation of this method will produce the fabric shown in the drawing, in which the staples and rubber rings occur in alternation, and in which, also, the rubber rings are located in alternation with each other, so as to produce a series of right angled triangles between the strands and the sides of the frame, and a series of squares between the strands themselves in all other parts of the fabric.

One of the advantages of this fabric is its capacity for admitting of indefinite variety in its appearance by a change in the character or material of the strands employed. The rubber springs may be ornamented in any manner desired. The elastic nature of the fabric is apparent upon inspection, as are also its economy both in material and ease of manufacture and facility for repairs.

I am aware that elastic bed-bottoms have been made by attaching the cords to elastic bands fastened to the rails, and also that portions of the cords have been made of elastic material. The cords have also been laced in the form of a lattice-work, being connected at their adjacent angles by means of links or rings fastened together by an elastic band. I do not claim any such arrangement; but

What I claim as new, and desire to secure by Letters Patent, is—

Making an elastic fabric suitable for bed-bottoms and other analogous purposes by means of securing the strands to the frame and lacing them to resemble lattice-work by passing the adjacent angles, formed by the sinuosities of the cord, through thimbles or short sections of india-rubber tubing, as described and represented.

HECTOR HYVES.

Witnesses:
J. P. HALL,
C. L. HUMBERT.